US005669404A

United States Patent [19]

Guillermo

[11] Patent Number: 5,669,404

[45] Date of Patent: Sep. 23, 1997

[54] APPARATUS AND METHOD FOR REPLACING THE DIVERTER VALVE ASSEMBLY IN A FAUCET

[76] Inventor: Pedro M. Guillermo, 501 Mayo Rd., Glen Burnie, Md. 21061

[21] Appl. No.: 719,362

[22] Filed: Sep. 25, 1996

Related U.S. Application Data

[62] Division of Ser. No. 306,380, Sep. 15, 1994, Pat. No. 5,586,571.

[51] Int. Cl.$^6$ .................... F16K 43/00

[52] U.S. Cl. .................... 137/15; 29/221.6; 29/402.08; 29/890.121; 81/436; 81/441; 81/442; 81/444; 81/461; 137/315

[58] Field of Search .................... 29/213.1, 221.6, 29/402.01, 402.03, 402.08, 890.12, 890.121; 7/170; 81/436, 441, 442, 443, 444, 461; 137/15, 328; 8/315, 34, 327

[56] References Cited

U.S. PATENT DOCUMENTS

| | | | |
|---|---|---|---|
| 1,411,242 | 3/1922 | Faust | 81/436 |
| 1,422,890 | 7/1922 | Sevier et al. | 81/441 |
| 1,604,032 | 10/1926 | Ferrell | 81/441 |
| 2,610,659 | 9/1952 | Shaker | 144/32 |
| 2,851,768 | 9/1958 | Ellis | 29/213 |
| 3,144,878 | 8/1964 | Williams | 137/625.31 |
| 3,559,690 | 2/1971 | Palmer | 137/801 |
| 3,952,618 | 4/1976 | Seamon | 81/441 |
| 4,058,030 | 11/1977 | Simmons | 81/53 R |
| 4,186,761 | 2/1980 | Guarnieri | 137/315 |
| 4,377,956 | 3/1983 | Cooper | 81/444 |
| 4,420,012 | 12/1983 | Astrom | 137/321 |
| 4,616,673 | 10/1986 | Bondar | 137/315 |
| 4,738,275 | 4/1988 | Buckalew | 137/315 |
| 4,739,788 | 4/1988 | Reback | 137/315 |
| 4,794,945 | 1/1989 | Reback | 137/315 |
| 4,842,009 | 6/1989 | Reback | 137/315 |
| 4,899,780 | 2/1990 | Astrom | 137/321 |
| 5,025,825 | 6/1991 | Gayton | 137/119 |
| 5,054,179 | 10/1991 | Rini | 29/213.1 |
| 5,119,556 | 6/1992 | Hseu | 29/264 |
| 5,279,329 | 1/1994 | Pippel | 137/625.29 |

*Primary Examiner*—George L. Walton
*Attorney, Agent, or Firm*—Leonard Bloom

[57] ABSTRACT

The invention herein disclosed is directed to a series of tools for repairing and replacing diverter valves. The tools are capable of functioning in many phases of diverter valve repair and replacement.

6 Claims, 16 Drawing Sheets

FIG. 15
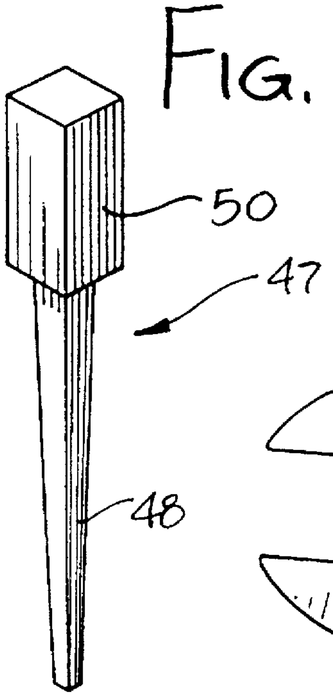
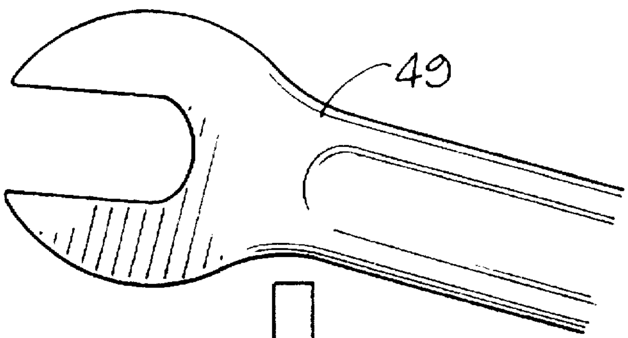
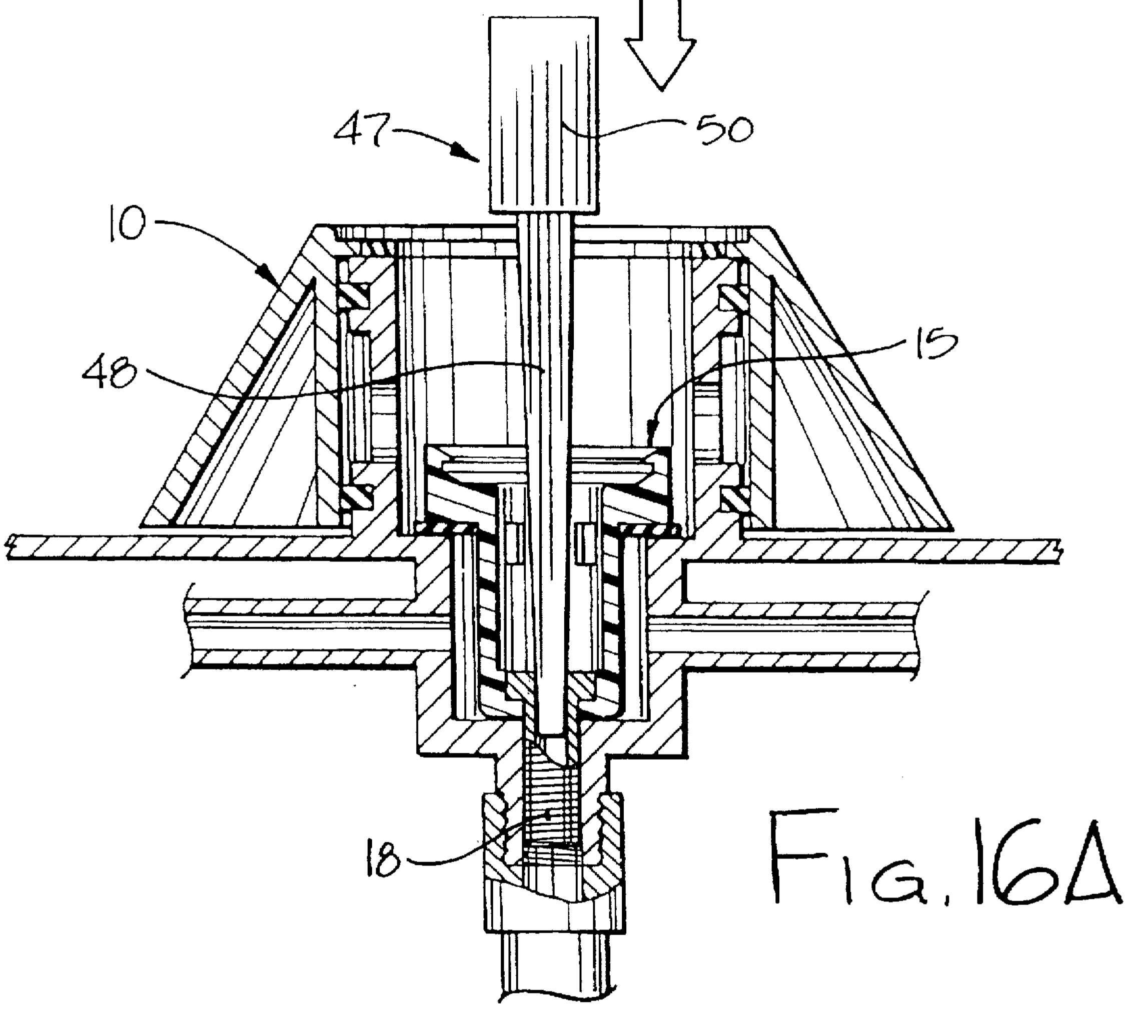
FIG. 16A

APPARATUS AND METHOD FOR REPLACING THE DIVERTER VALVE ASSEMBLY IN A FAUCET

This application is a division of U.S. application Ser. No. 08/306,380, filed Sep. 15, 1994, now U.S. Pat. No. 5,580, 571.

FIELD OF THE INVENTION

The invention relates to devices for removing, repairing and replacing faucet diverter valve assemblies. These diverter valve assemblies are also referred to as diverters or diverter valves. The diverter valve is found in the spout assembly of the faucet. The diverter valves are so called because they facilitate the diversion of water from one area to another. For example, the diverter valve diverts water from the faucet to the spray.

BACKGROUND OF THE INVENTION

Kitchen sinks in the modern household generally come equipped with a spray in addition to the standard faucet. In use, the spray diverts water through a thin hose to areas and for use that the standard faucet would not be able to reach. The spray is actuated by squeezing a handle close to the nozzle of the spray. Once the nozzle handle is squeezed, water running from the faucet is diverted from the faucet to the nozzle of the hose and can be sprayed in areas inaccessible to the faucet.

In many models the key element for diverting the water from the faucet to the spray is a diverter valve or diverter valve assembly. This assembly is contained within the faucet unit. The diverter valve functions when the handle on the nozzle is squeezed. The squeezing of the handle relieves pressure on the poppet valve in the diverter valve assembly and thereby diverts water from the faucet to the spray.

In normal use of the faucet, water from the main inlet conduit will flow upwardly through the diverter valve raising a poppet valve to an upper position and permitting the water to pass through windows or openings in the diverter valve to the faucet. With the spray handle closed, hydraulic pressure from water in the spray hose maintains pressure on the poppet valve forcing the poppet valve into the raised position allowing water to pass to the faucet. When it is desired to use the spray, squeezing of the spray handle reduces pressure at the faucet outlet, as well as, within the diverter valve assembly. This reduction of pressure draws the poppet valve down upon its seat within the diverter valve assembly, thus preventing water from flowing to the faucet and allowing the flow of water to the spray.

U.S. patents are cited to show the state of the art.

Diverter Valves

U.S. Pat. No. 3,144,878 to Williams teaches a diverter valve for the spout of a faucet. The diverter valve diverts water between aerator flow and normal faucet flow in the faucet. The diverter in the patent to Williams depends on the manual changing of the flow-direction from aerator normal flow to the spray. Note that the diverter of Williams is hand actuated rather than hydraulically actuated.

Palmer in U.S. Pat. No. 3,559,690 discloses a diverter which is a hand actuated valve with a handle for directing water from the tub to the shower head. The valve shown by Palmer is not one with a poppet valve, but one operated through a cylinder. The valve is moved into the water-diverted position by changing the valve position by hand.

A diverter valve actuated by the handle on the spray hose is disclosed by Gayton in U.S. Pat. No. 5,025,825. In operation the Gayton diverter assembly operates through a poppet valve in the diverter. The popper valve is opened and closed by hydraulic pressure. In the normal position water fills the spray hose and maintains water pressure or hydraulic pressure on the poppet valve, so that water flows to the faucet. Pressing on the spray handle releases the hydraulic pressure in the spray hose causing the poppet valve to seat with the water being directed to the spray. Once water is directed to the spray, water to the faucet is cut-off through the movement of the poppet valve to its unseated or second position.

U.S. Pat. No. 5,279,329 to Pippel describes a diverter assembly operated by hand to divert the flow of water through different paths.

Tools for Removing Parts of Plumbing Fixtures

Simmons in U.S. Pat. No. 4,058,030 discloses a socket-type wrench for removing a faucet from the sink.

A wrench-type device for removing and installing water faucet valves is taught by Rini in U.S. Pat. No. 5,054,179.

Hseu shows in U.S. Pat. No. 5,119,556 a tool for removing a faucet stem and cartridge from a faucet body. The tool shown in this patent engages the faucet stem through a threaded member. A handle received by the threaded member is turned, tightening on a standoff sleeve to exert upward pressure on the faucet stem and thereby cause its removal.

Elis in U.S. Pat. No. 2,851,768 discloses a threaded valve insert removing and applying tool. This tool has a rib running diametrically across the outer face of a bit. The rib engages the valve and it is screwed out.

None of the prior art cited shows a device specifically designed to remove, repair and to replace a faucet diverter valve.

SUMMARY OF THE INVENTION

An object of this invention is to produce tools which will facilitate the removal of diverter valves.

A further object of this invention is to produce tools which will facilitate the repair of diverter valves.

An additional object of this invention is to produce a series of tools in a kit which will aid in the removal and repair of various brands of diverter valves.

A diverter valve assembly typical of those on which the tools of this invention will be used is described in U.S. Pat. No. 5,025,825 and includes a poppet valve mounted on a valve seat of an inlet/outlet port. When water is flowing through the faucet, rather than the spray, the poppet valve is unseated or off of the valve seat. Once the spray handle is squeezed, hydraulic pressure in the tube is released, the poppet valve seats itself on the valve seat of the inlet/outlet port and water is diverted to the spray for rinsing, etc.

The exemplary diverter valve which is amenable for use with the tools of this invention is a cylindrical two sectional valve assembly housing a poppet valve. The very top portion of the cylinder is an annular flat top and is supplied with opposing slots to receive a screwdriver or like instrument for unscrewing the diverter valve from its normal operational position in the faucet. The bottom portion of the diverter valve assembly accommodates a threaded tube mounted on its bottom. In the normal operational position of the diverter valve the threaded tube is screwed into the line supplying water to the faucet and spray. Water flows through the threaded tube to the poppet valve where the water will be diverted depending on the hydraulic pressure on the poppet valve. The two halves of the typical diverter valve are generally held together through a circular flange which engages a circular groove on the respective top and bottom members of the diverter valve.

The unique tools of this invention are designed to expeditiously remove and repair a variety of diverter valve assemblies. The tools are designed to repair diverter valve assemblies with a coupled housing; and more specifically, the tools are designed to remove and repair primarily diverter valves with a two-sectional housing. Many Delta and Peerless faucet diverter valves are amenable to removal and repair with the tools of this invention. For example, Delta faucet Model No. 2402 (RP6073) and Peerless faucet Model No. 3653 (RP6266).

In the prior art, the diverter valve assembly with enclosed poppet valve, described above, was removed using a broad-bladed screwdriver (or as some manufacturers' brochures recommended, using a coin) inserted into the opposing slots at the top or annular flat top of the hollow cylinder of the valve assembly. This method was inefficient because with the use of the coin, enough leverage was not generated to remove the valve. The screwdriver method was equally inefficient because the screwdriver would not seat properly in the slots and would thereby supply an unbalanced axial thrust load, which would break the top of the diverter housing and make removal next to impossible.

The diverter valve removing tool of this invention is designed such that its tang and shoulder register accurately with the annular top and diametrically opposing slots or notches on the top section of the diverter valve assembly. The tool supplies a balanced axial thrust load. In this way the diverter valve assembly can be unscrewed without damaging or breaking the top of the diverter valve.

With the diverter valve removed the repairman has several options. He can replace the old valve with a new diverter valve; or he can take apart the valve assembly and replace the top portion containing the poppet valve or the bottom threaded portion of the valve assembly, which ever is defective. A third option is to clean the valve assembly and reinsert it into the faucet. Regardless of the option chosen, the repairman can save much valuable time using the tools of this invention.

If the top section of the valve assembly is to be replaced, this invention supplies an expanding split sleeve tool which will fixedly engage the top of the valve assembly with an expandable split sleeve which tightly attaches to the top half of the valve assembly. By pulling up on the attached expanding split sleeve tool, the top half of the valve can be removed, leaving the bottom half seated.

The expanding split sleeve tool has a second use. It can hold the top half of the diverter valve while the tapped hole tool holds the threaded end of the valve. The tapped hole tool has a tapped hole at its end and the other end is a handle. The tapped hole receives the threaded tube on the bottom of the valve assembly. By grasping in one hand the handle of the tool with the tapped hole having a threaded tube therein, and in the other hand the expanding split sleeve tool attached to the top of the valve; and bending or flexing the two tools at right angles, the top and bottom of the valve assembly can be easily separated from one another.

From time-to-time the metal threaded tube at the bottom of the diverter assembly separates from the plastic portion of the diverter assembly. With this being the case, the assembly cannot be separated using the noted tang and flat shoulder tool. The herein disclosed invention supplies an elongated wedge tool with a long tapered wedge which can be wedged into the top of the threaded tube of the bottom half of the valve assembly and the wedge tool turned to extract the threaded tube.

In a preferred embodiment there is disclosed a tool to be used in repair of diverter valves which have diametrically opposing slots on an annular flat top and a threaded tube at the bottom, said tool has a first end portion and a second end portion; the first end portion has at right angles to the longitudinal axis of the tool a flat shoulder with a tang set at right angles to the flat shoulder, said flat shoulder and tang register with said annular flat top with two diametrically opposing slots to take up axial thrust load applied while removing said diverter valve; said second end portion attaches an axial tapped hole for receiving said threaded tube of said diverter valve. In a special embodiment there is a wrench gripping surface between the first end portion and second end portion of the tool.

A method is herein disclosed for removing a threaded-in diverter valve having an annular flat top accommodating two diametrically opposing slots therein, comprising (1) inserting in registry with said annular flat top and said diametrically opposing slots the tang and flat shoulder of a tool, respectively, said tool having a first end portion and a second end portion; the first end portion has at right angles to the longitudinal axis of said tool a flat shoulder with a tang set at right angles to said flat shoulder, said flat shoulder and tang register with said annular flat top accommodating two diametrically opposing slots to take up axial thrust load applied while removing said diverter valve; and said second end portion attaches a handle for applying axial thrust load; and (2) applying axial thrust load through said handle to said threaded in diverter valve to remove said diverter valve.

A special tool which is part of this invention is an expanding split sleeve tool for efficiently removing the bottom section of a diverter valve or aiding in the separation of the top and bottom sections of a diverter valve comprising a shaft having a first end and a second end, said first end being threaded and said second end mounting a frusto-conical wedge with its base at the end of the shaft, an expandable split sleeve having projections and expandable tabs is slidably inserted on said shaft so that the expandable tabs butt against the frusto-conical wedge or flared end, a sliding member is inserted over the threaded end of the shaft to butt against the projections of the expandable split sleeve at the end opposite the expanding tabs and to also substantially engage threads on the shaft; a flat washer is inserted over the threaded end of the shaft to butt against the sliding member and a nut is threaded onto the shaft to meet the flat washer, said expanding split sleeve tool when its frusto-conical wedge end and expandable tabs are inserted into the annular head at the top of a diverter valve and the nut tightened to expand the expandable tabs securely against the wall of the diverter valve. With the expandable tabs secure against the wall of the diverter valve the expanding split sleeve tool is lifted with adequate force, to separate the top of the diverter valve from the seated bottom half.

The invention herein disclosed involves a method for extracting the threaded tube portion of a diverter valve from its seated position in a faucet. This is done by inserting the wedge end of an elongated wedge tool, which has a first end elongated wedge and a second end gripping surface into the exposed portion of the threaded tube. Then applying force to the top of the gripping surface to wedge the elongated wedge into the threaded tube and applying a wrench to the gripping surface to remove the threaded tube.

Another method of this invention involves removing the detached annular top portion of a diverter valve from a faucet, the improvement comprising fixedly inserting into the annular top portion of said diverter valve the tapered wedge of an elastomeric wedge tool. Said elastomeric wedge tool having a first end and a second end. The first having attached thereto a wedge and the second end has a handle. After the tool is fixedly inserted into the annular top, the handle is lifted to extract the annular top portion attached to the elastomeric wedge tool.

A unique feature of this invention is a kit containing tools for removing a diverter valve from a faucet. The kit contains a tang and flat shoulder tool, a tapped end tool an elongated split sleeve tool, an elongated wedge tool and an elastomeric wedge tool. The kit can also contain an interchangeable handle, and the tools can have ends which can be fitted onto said interchangeable handle. In addition as an improvement, handle can be a ratcheting handle.

BRIEF DESCRIPTION OF THE DRAWING

FIG. 15 is a view illustrating the elongated wedge tool.

FIG. 16A is an elevational view illustrating the elongated wedge tool being wedged into the threaded tube of the bottom of the valve and with a wrench shown tapping in the elongated wedge tool. The arrow shows the direction in which the wrench is moved to tap the wedge into the threaded tube.

BRIEF DESCRIPTION OF THE PREFERRED EMBODIMENTS

Figure 1:
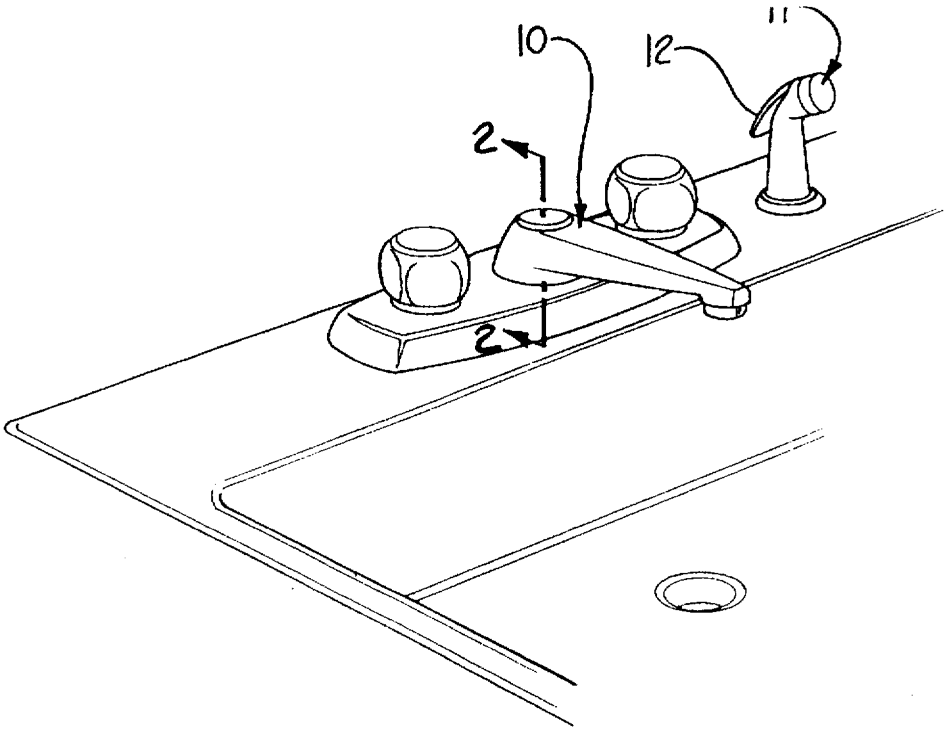
FIG. 1 is a partial perspective view showing faucet assembly and spray mounted in a sink (only partially shown).

Referring to FIG. 1 a faucet 10 houses a diverter valve assembly (not shown). The spray 11 is actuated when the handle 12 on the spray 11 is squeezed.

Figure 2:
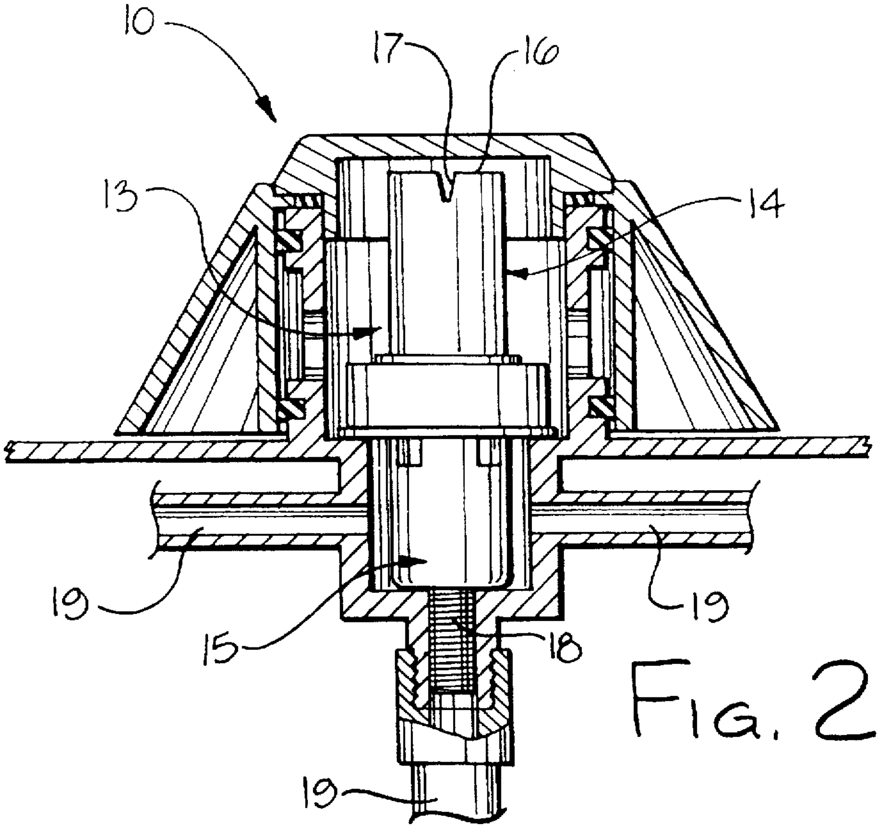
FIG. 2 is a cross-section of the faucet taken along lines 2—2 of FIG. 1 showing diverter valve in elevation.

With reference to FIG. 2 a diverter valve 13 representative of those found in use is shown seated in a faucet 10. The diverter valve 13 shown is made of a top half 14 and a bottom half 15 with a poppet valve contained therein (not shown). The two halves 14, 15 of the valve are Jointed through an interlocking snap-fit (not shown). The two halves 14, 15 are separated by being forced apart by a bending action to separate the top and bottom halves of the diverter valve. The top half 14 of the diverter valve assembly 13 has an annular top 16 with a diametrically opposing slots 17 therein. Only one slot is shown in the figure. The bottom half 15 of the diverter valve assembly 13 has a threaded tube 18 secured therein. Water is supplied to the faucet 10 and spray 11 through the threaded tube 18 which is connected to water supply pipes 19.

Figure 3:
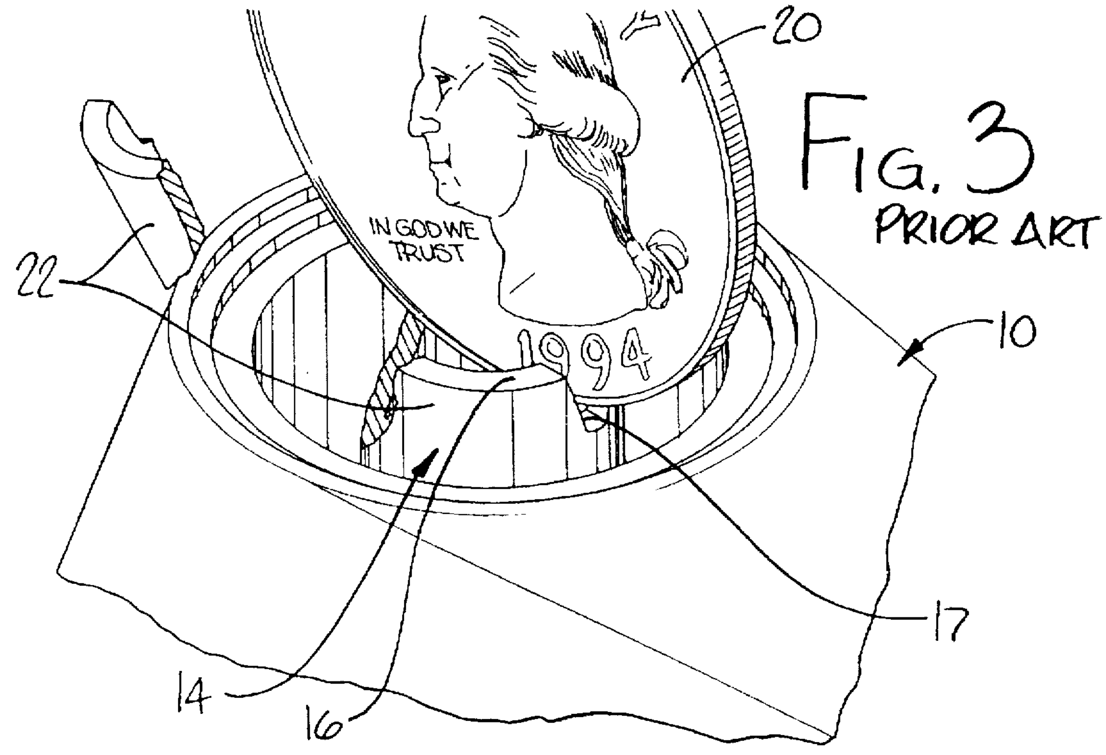
FIG. 3 PRIOR ART
FIG. 3 is a view illustrating the prior art method for removing diverter valve using a coin, which breaks the diverter valve top.
Figure 4:
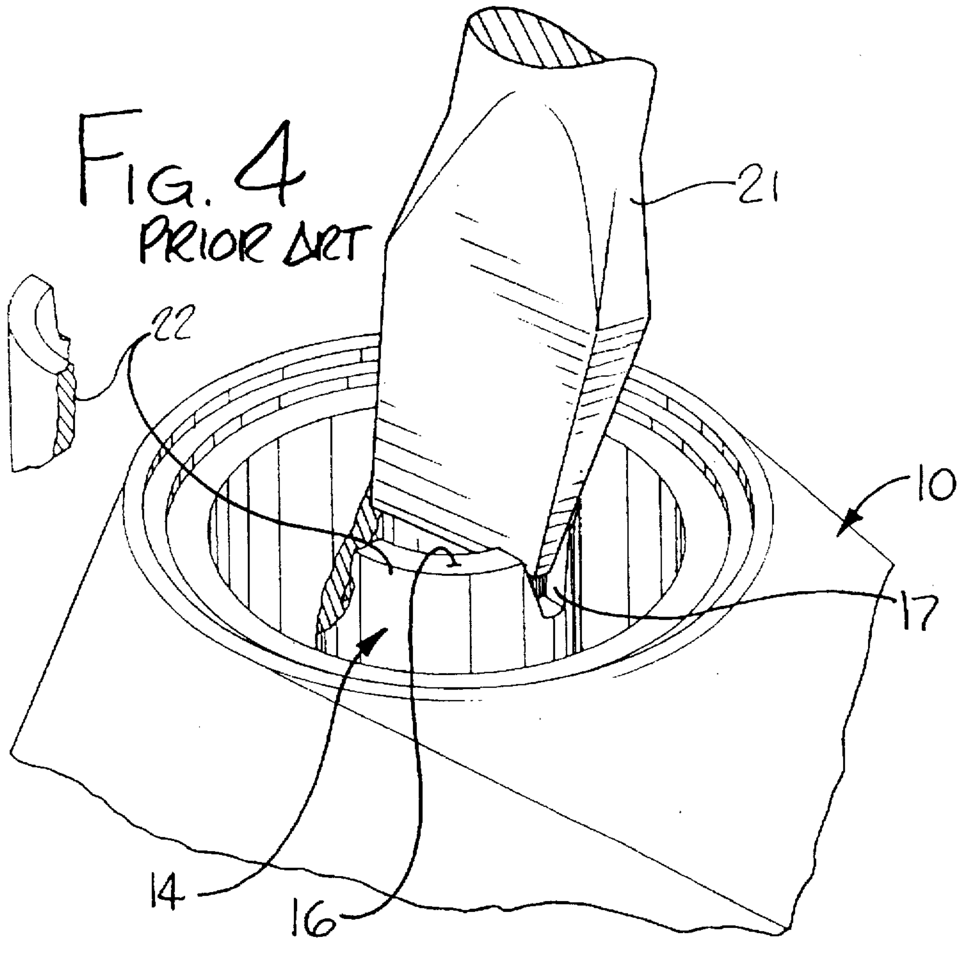
FIG. 4 PRIOR ART
FIG. 4 is a view illustrating the prior art method for removing the diverter valve using a screwdriver, which breaks the diverter valve top.

The prior art methods for removing the diverter valve (FIGS. 3 and 4) were inefficient. One method suggested by the manufacturer was to use a coin 20 in the slots 17 in the annular top 16 of the valve 13 to unscrew the valve 13 (FIG. 3). Another method used a screwdriver in the slots 17 to remove the diverter valve 13 (FIG. 4). The coin method was inefficient because the coin 20 was difficult to grip and sufficient leverage could not be placed on the valve top 16 to unscrew the valve 13 from the faucet 10. Further, in the use of either the screwdriver 21 or the coin 20 for removing the valve 13, the top 16 of the diverter valve 13 could break 20 due to the stress of the axial thrust load unevenly applied to the top 16 of the diverter valve 13.

With reference to the figures, a series of elegant tools are shown for removing and servicing the diverter valve.

Figure 5:
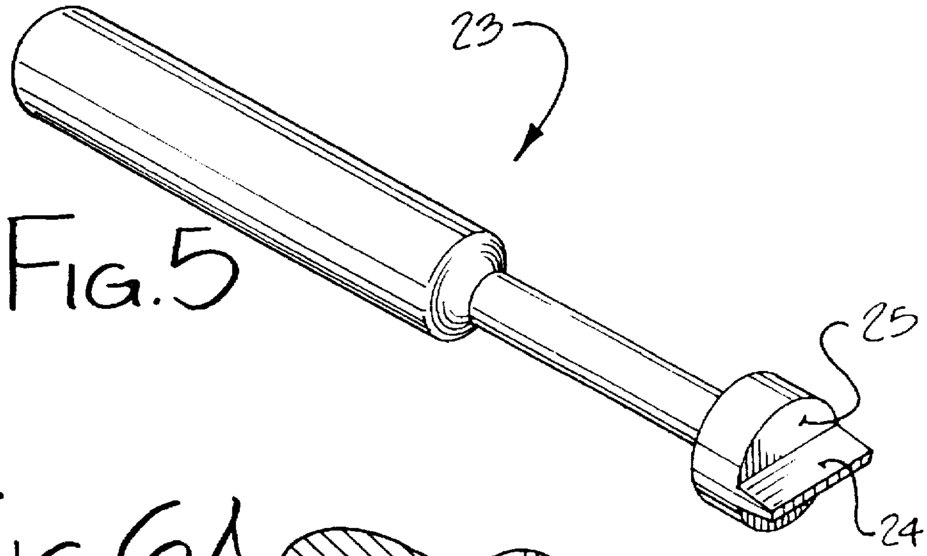
FIG. 5 is a view illustrating the tool with tang and flat shoulder of the invention.
Figure 6A:
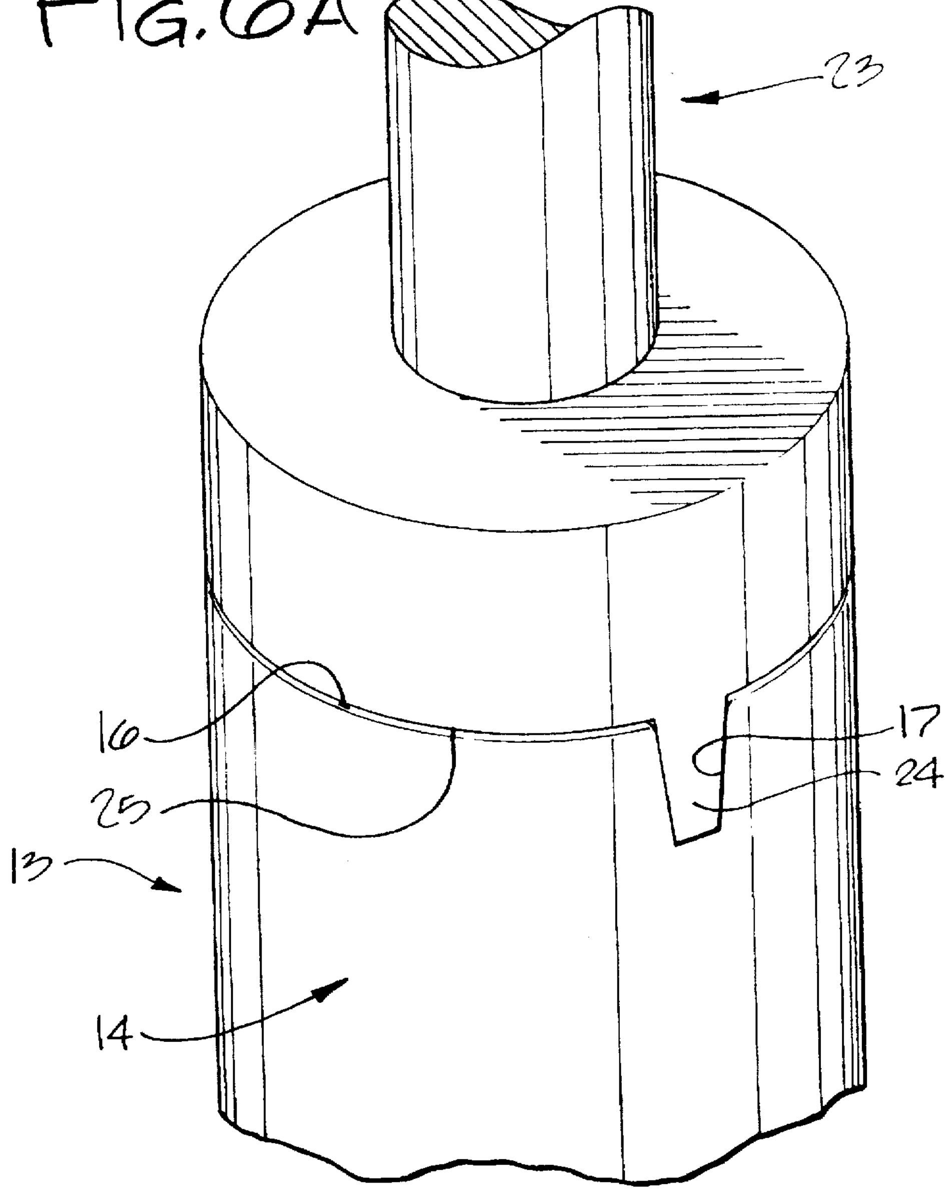
FIG. 6A is a greatly enlarged view illustrating tang and flat shoulder of the tool in registry with the annular top and opposing slots of the diverter valve.

The primary tool 23 (FIG. 5) for removing a diverter valve 13 from the faucet 10 is a tool 23 having a tang 24 set at right angles to a flat shoulder 25. The tang 24 and flat shoulder 25 are fashioned so as to register fully or substantially with the annular flat top 16 and diametrically opposing slots 16 of the top of the valve 13. Since the tang 24 and the flat shoulder 25 virtually register with the slots 17 and annular flat top 16 of the valve 13 (FIG. 6A), the top 16 of the valve 13 will not break when an axial thrust load is applied to remove the valve 13. Note that in FIG. 6A the tang 24 and the flat shoulder 25 are in substantial registry, however it is more essential that the flat shoulder 25 be in registry; the tang 24 can be somewhat raised from the bottom of the slot 24.

Figure 6B:
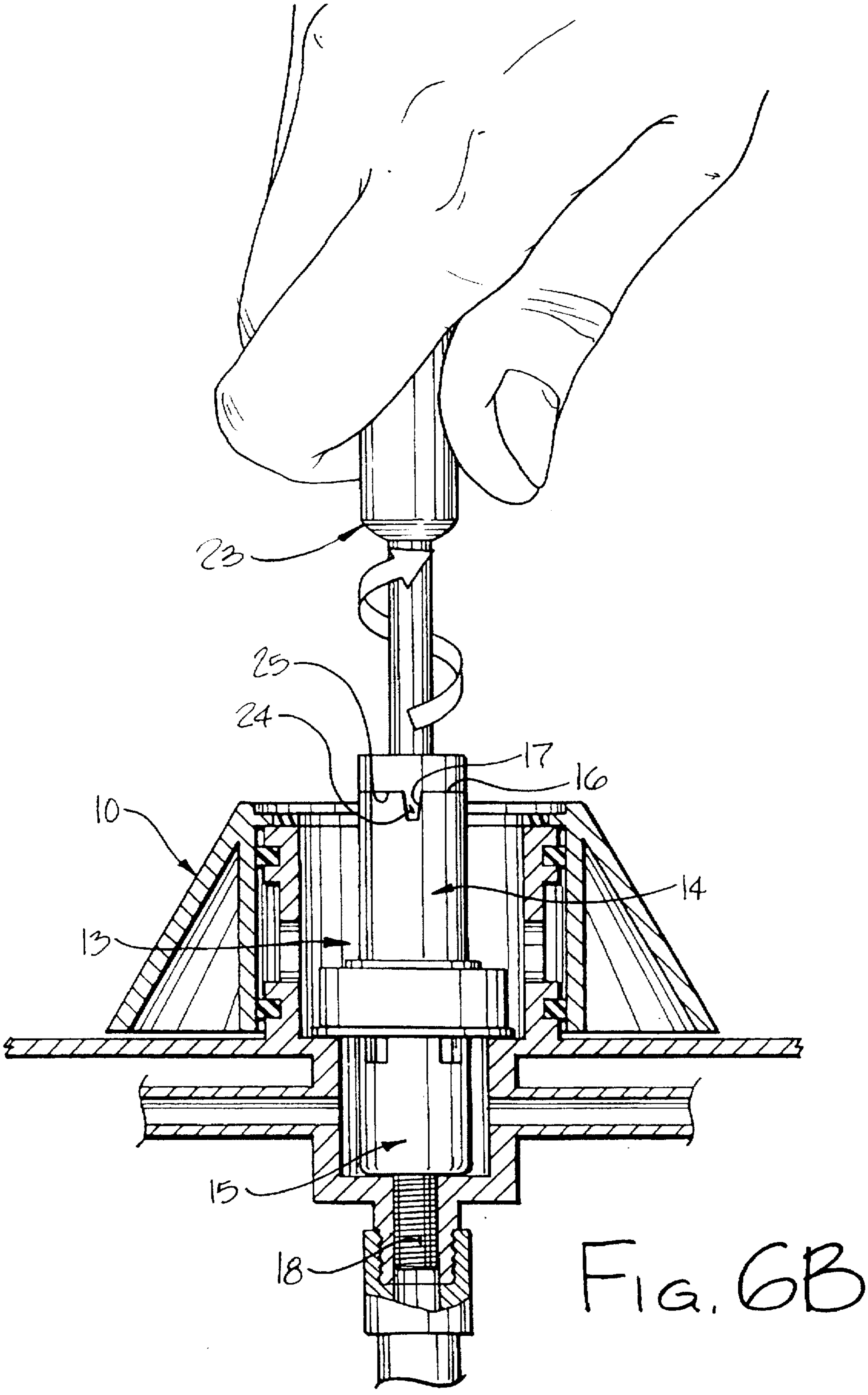
FIG. 6B is an elevation view illustrating the tang and flat shoulder of the tool in registry with the annular top and opposing slots of the diverter valve, the tool is in position to apply axial thrust load to unseat the diverter valve. The arrow shows the direction in which axial thrust load is applied to the tool.

In order to remove the diverter valve 13 simply insert the tang 24 of the tool 23 into the slots 17 and align the flat shoulder 25 with the annular top 16 of the diverter valve 13, and apply axial thrust load with the tang and shoulder tool 23 (FIG. 6B). Since the tang 24 and flat shoulder 25 are in registry with the opposing slots 17 and annular top 16, the diverter 13 can be unscrewed easily without breaking or cracking the top 16 of the diverter valve 13.

Figure 7:
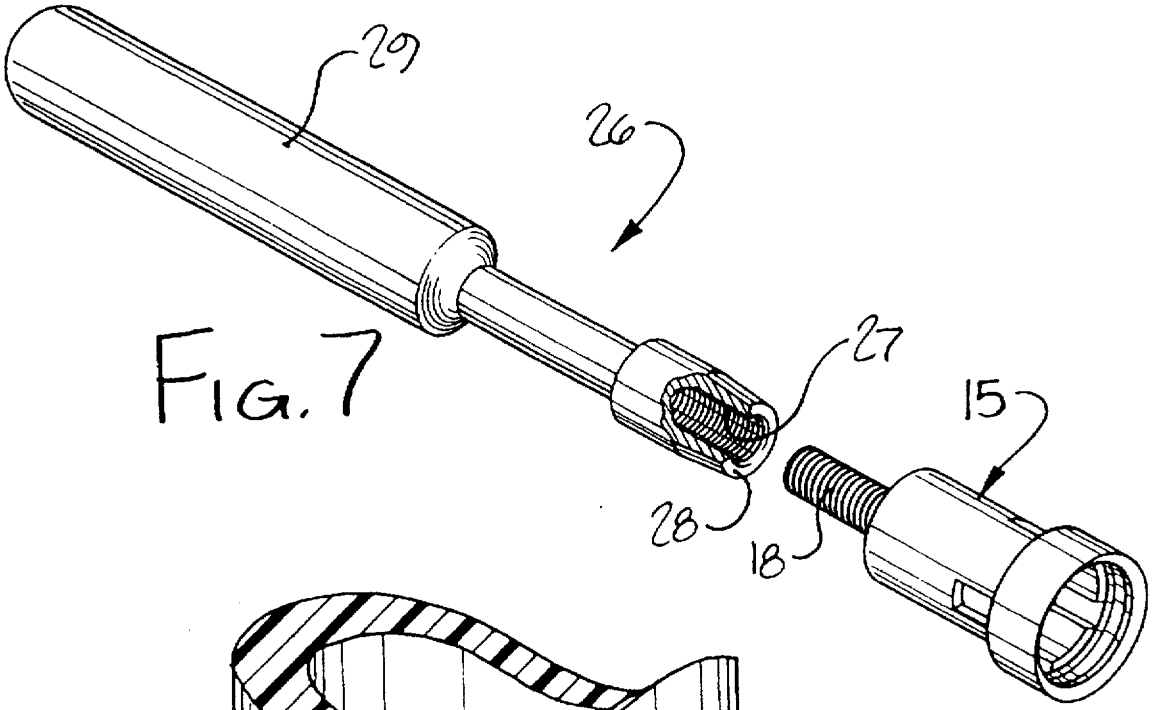
FIG. 7 is a perspective view of a tool with tapped hole for receiving the threaded tube end of the diverter valve. Part of the tapped end is broken away to show the threads. Only the bottom half of the diverter valve assembly is shown for ease of illustration.
Figure 8:
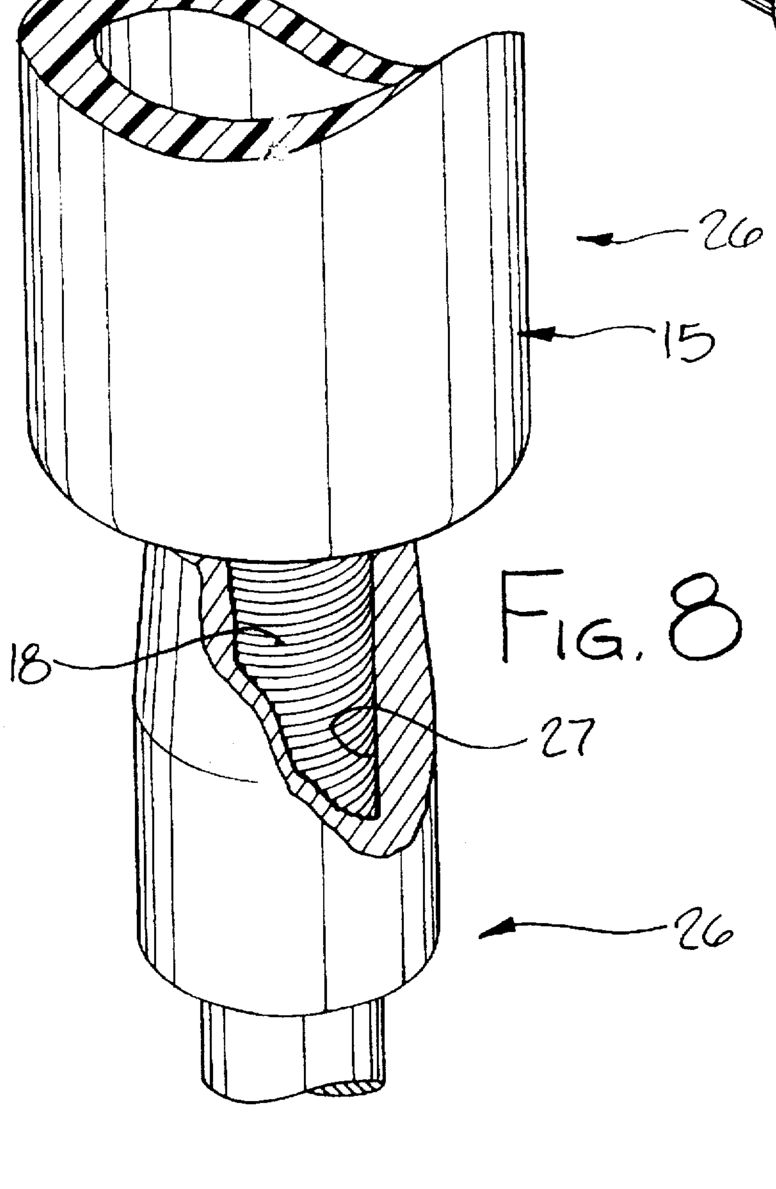
FIG. 8 is an enlarged perspective view of the tool with the tapped hole with the threaded tube received therein. Parts of the tool and valve have been shortened for ease of illustration; and part of the tool has been broken away to show the threaded tube received in the tapped hole.
Figure 13:
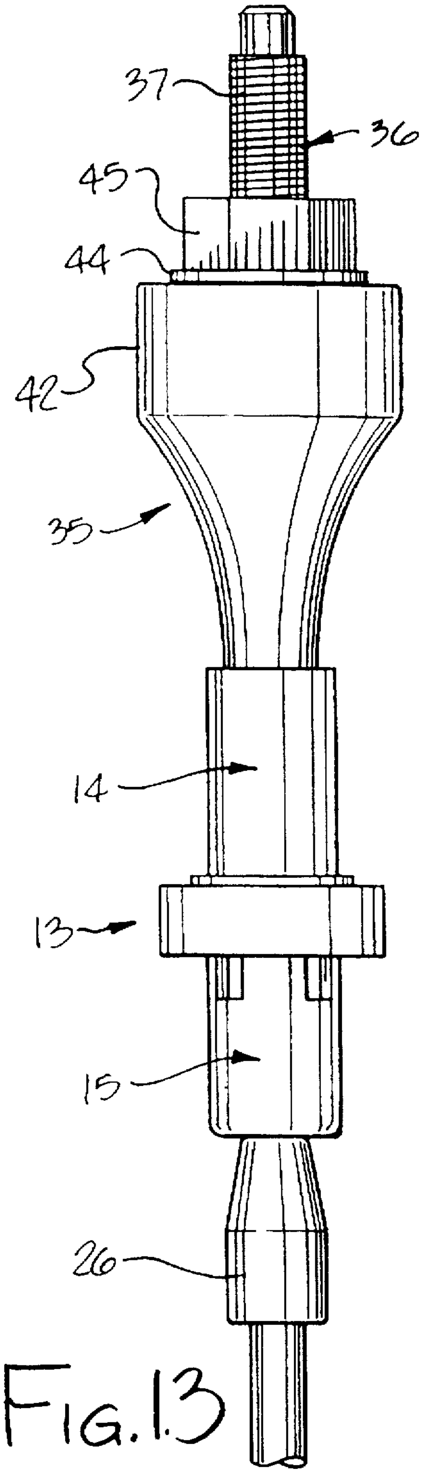
FIG. 13 is an elevational view illustrating an alternative use of the expanding split sleeve tool. The expanding split sleeve tool and the tapped end tool are attached to the diverter valve assembly prior to separating the two halves.
Figure 14:
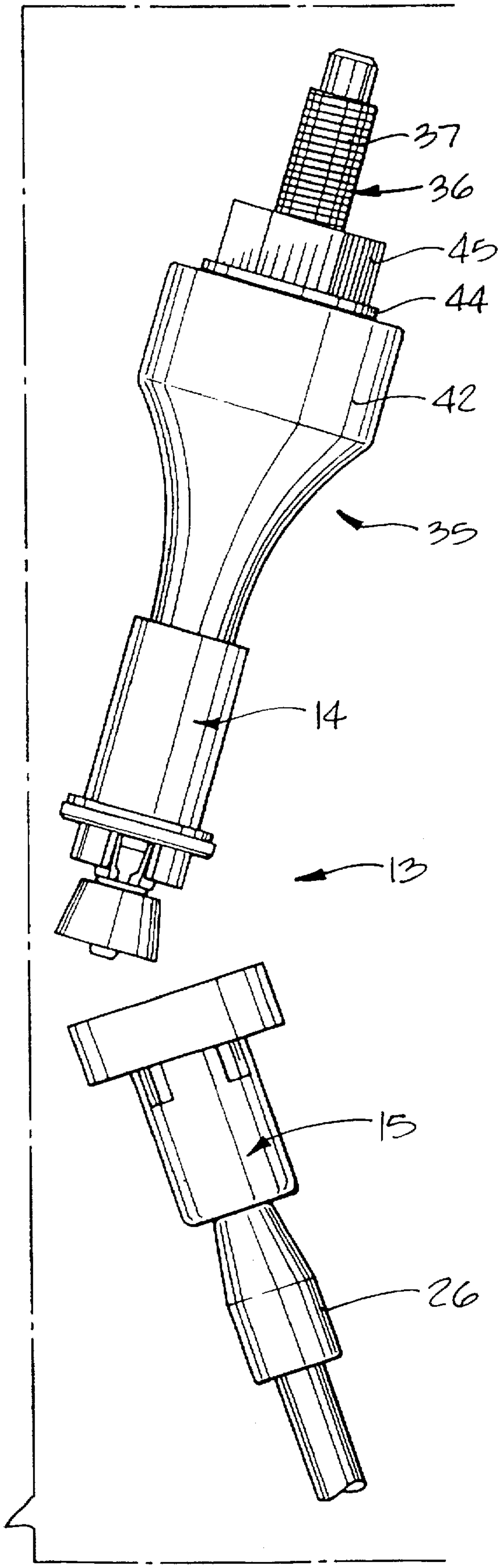
FIG. 14 is a view thereof showing the two halves of the diverter valve separated.

The tool 26 of FIG. 7 has a tapped hole 27 in its end. This tapped hole 27 is designed to receive the threaded tube 18 in the bottom section 15 of the diverter valve 13 (FIG. 8) and to provide a convenient grip 29 for holding the diverter valve 13 when the top 14 and bottom 15 of the diverter valve 13 are to be separated (FIGS. 13–14).

Figure 9:
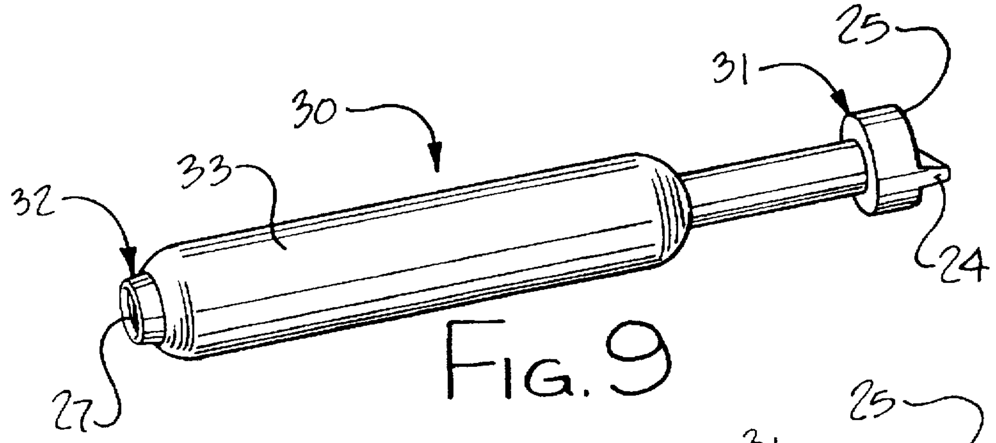
FIG. 9 is a perspective view of a tool combining the tang portion and the tapped end portion of the tool.
Figure 10:
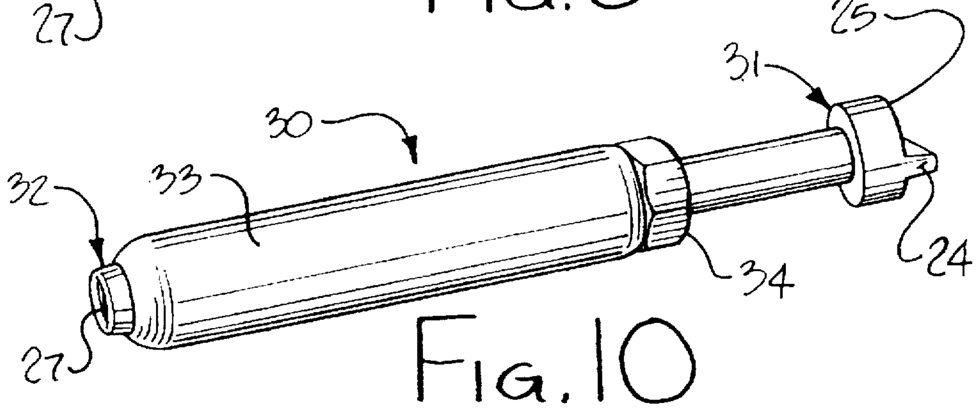
FIG. 10 is a perspective view of a combined tool showing a hexagonal wrench gripping surface for applying a wrench.

As a unique embodiment of this invention, the tang portion 31 of the tool 30 and the tapped hole portion 32 of the tool 30 are provided on the same instrument 30 (FIGS. 9–10).

With reference to FIG. 10 the combined tool 30 has placed on its elongated joining member 33 a wrench gripping surface 34 to facilitate the placement of a wrench (not shown). While the gripping surface in the figure is shown in a hexagonal configuration 34. Other multi-sided or roughened surfaces to which a wrench could be applied would be operative.

Figure 11:
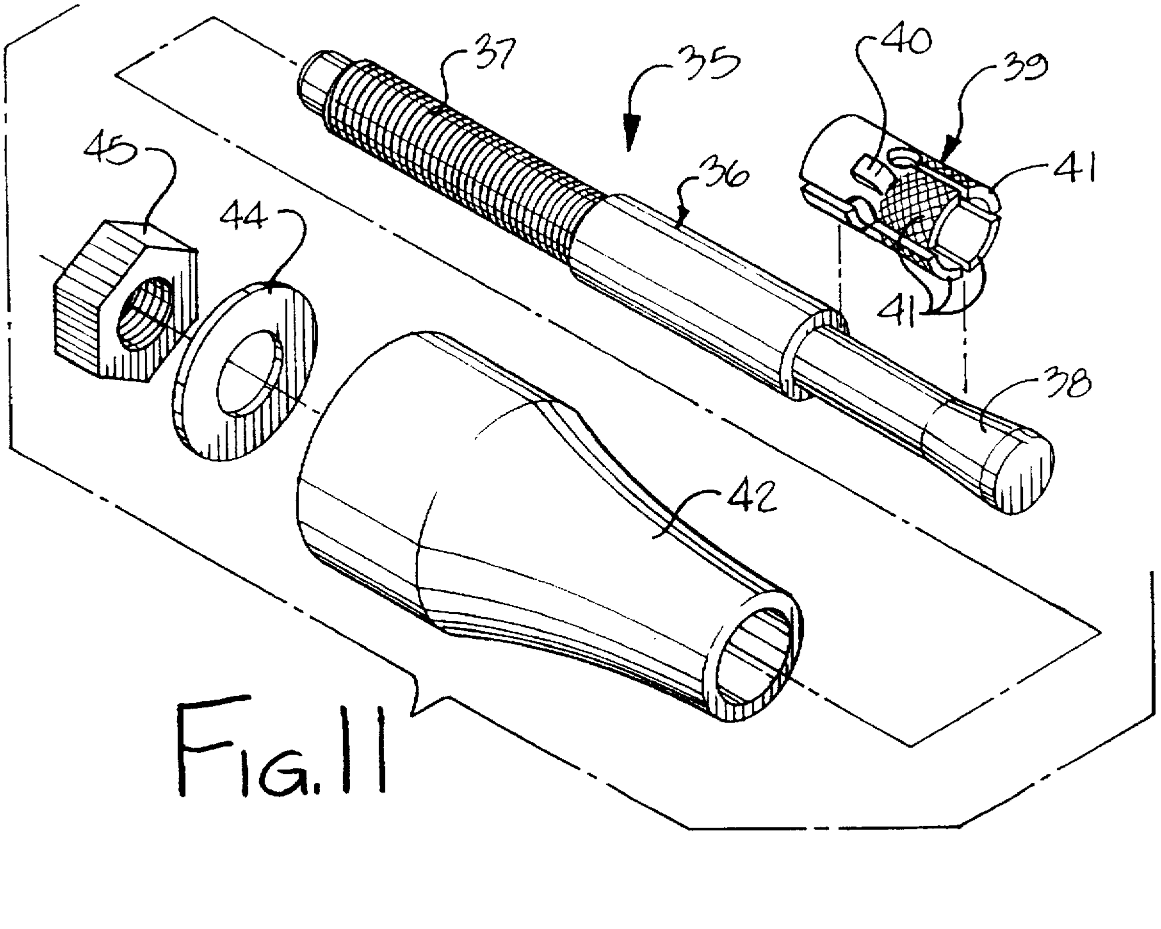
FIG. 11 is an exploded view of the expanding split sleeve tool.

Referring to FIG. 11 the expanding split sleeve tool 35 has a shaft 36 which is threaded 37 on one end and has a frusto-conical wedge 38 at the other. A split sleeve 39 of a diameter smaller than the frusto-conical wedge 38, is slidably mounted on the shaft 36 at the frusto-conical wedge 38 end or flared end. The split sleeve 39 has projections 40 and expandable tabs 41 on an end adjacent to the wedge 38. A sliding member 42 is inserted over the threaded end 37 of shaft 36 to butt against the split sleeve 39 at the end opposite the expanding tabs 41 and will also overlap and substantially engage threads 37 on the shaft 36. A flat washer 44 is inserted over the threaded end 37 of the shaft 36 to butt against the sliding member 42. A nut 45 is threaded onto the shaft 36 to meet the flat washer 44.

Figure 12A:
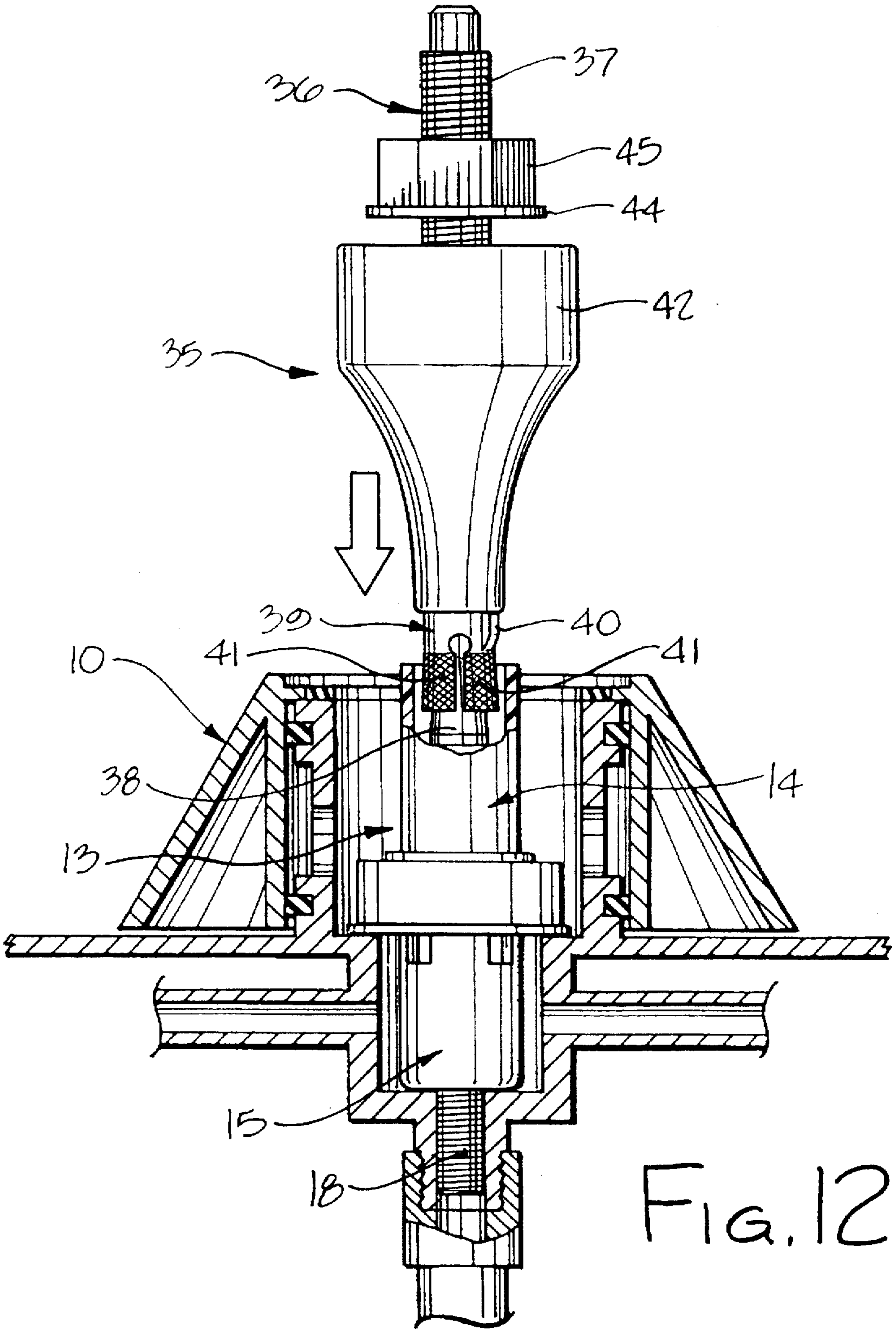
FIG. 12A is an elevation view of the expanding split sleeve tool inserted into the annular top of the diverter valve seated in the faucet. Part of the annular top is broken away to show the original inserted position of the expanding split sleeve tool. The arrow shows the direction for inserting the expanding split sleeve tool. Part of the water supply is broken away to show the threaded tube at the bottom of the valve.
Figure 12B:
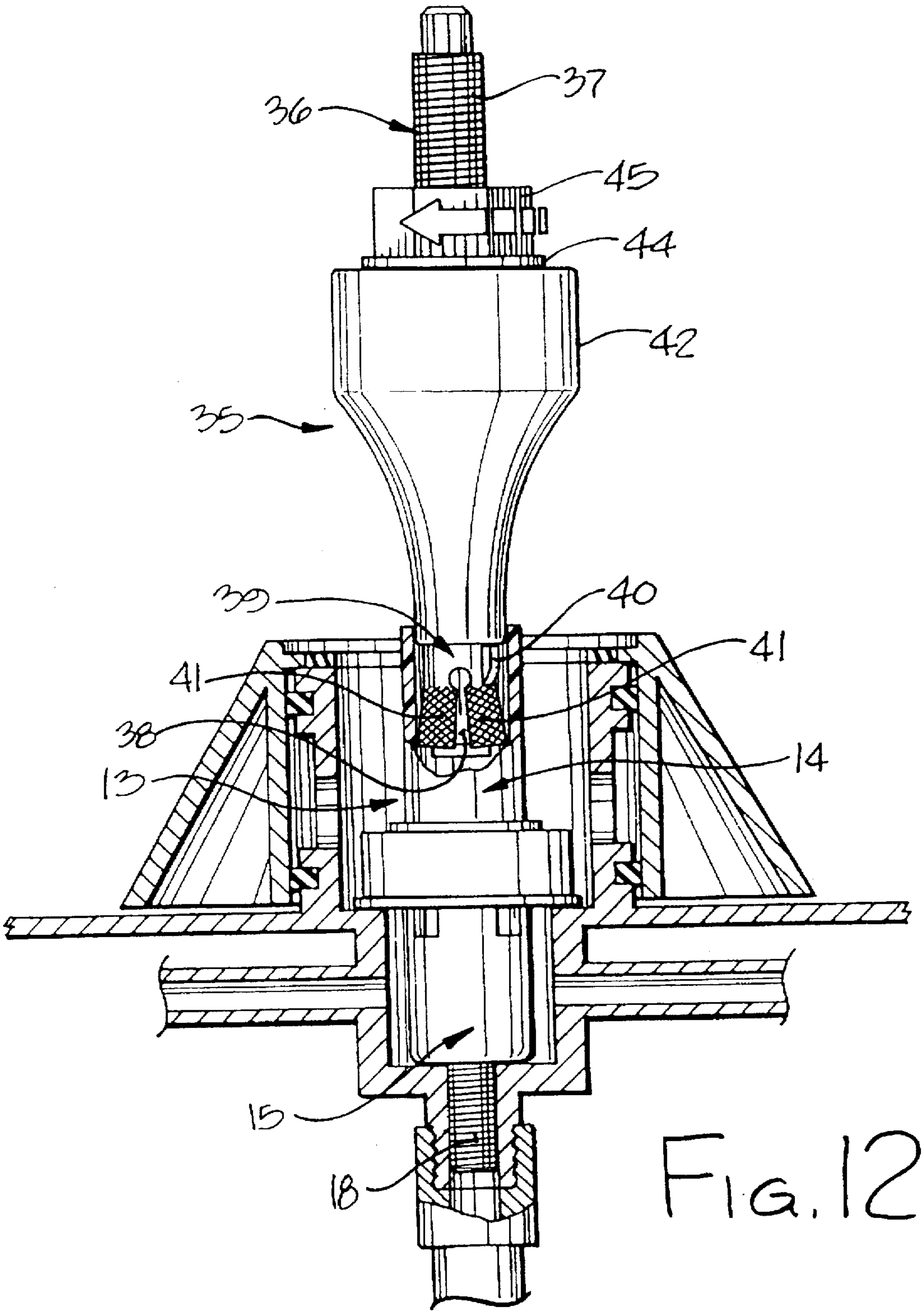
FIG. 12B is a view thereof showing the expanding split sleeve tool fully inserted and the split sleeve expanded against the inside of the valve by turning the nut at the top of the expanding split sleeve tool. The arrow shows the direction the nut is turned to expand the split sleeve.
Figure 12C:
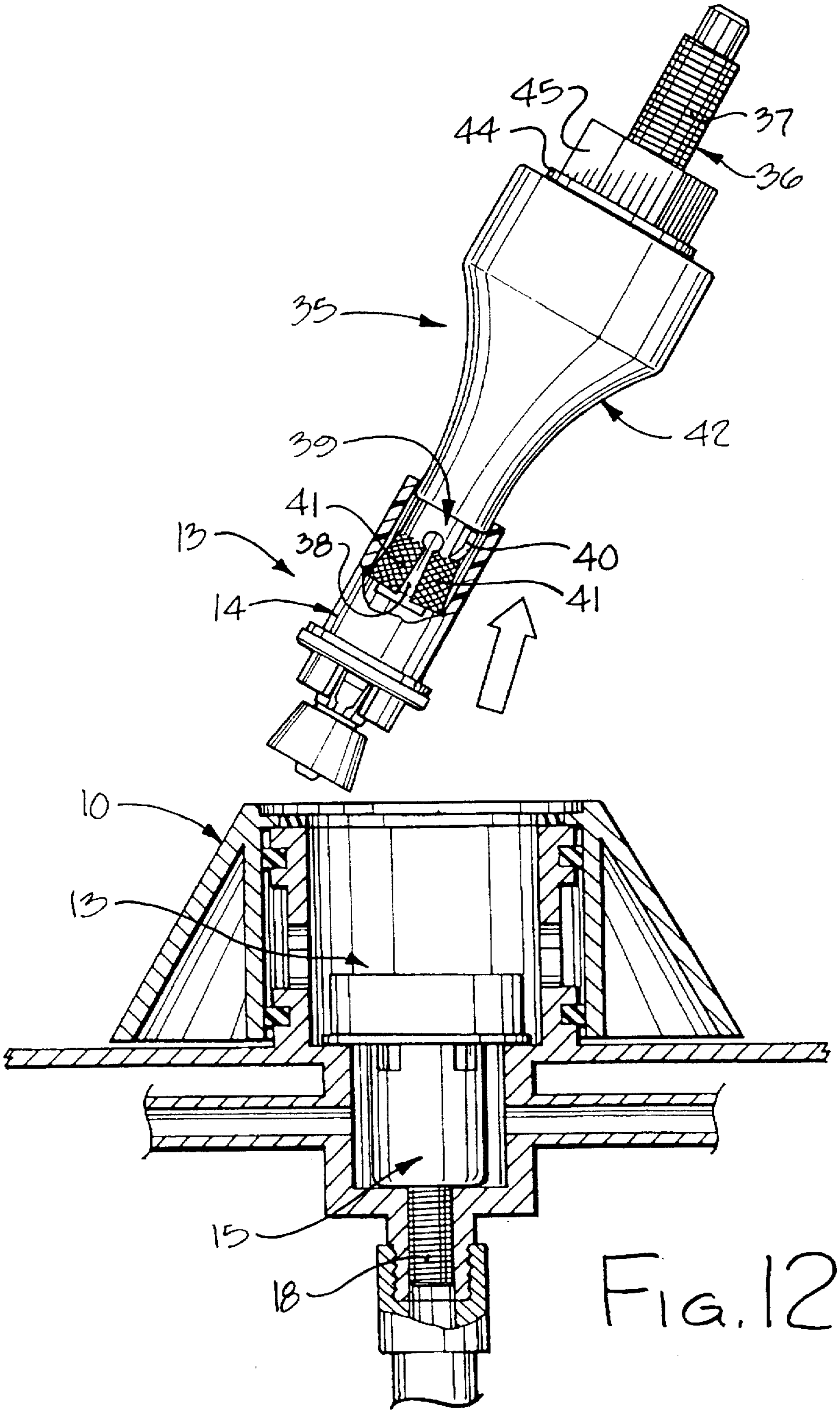
FIG. 12C is a view thereof with the top of the diverter valve removed from the bottom half of the valve. The arrow shows the direction of the top of the valve being lifted out by the expanding split sleeve tool.

FIGS. 12A–12C illustrate the method of using the expanding split sleeve tool 35 to remove the top half 14 of the diverter valve 13 without having to unscrew the entire seated diverter valve 13. Referring to FIG. 12A, the expanding split sleeve tool 35 is inserted into the top half 14 of the seated diverter valve 13. The arrow shows the direction in which the tool 35 is inserted. Once the tool 35 is inserted (FIG. 12B) a wrench (not shown) is applied to the nut 45 on the threaded shaft 37 forcing the sliding member 42 down against the projections 40 of the expanding split sleeve tool 35. This causes the split sleeve tabs 41 to be forced down over the frusto-conical wedge 38, causing the tabs 41 to expand and the sleeve 39 to widen applying pressure on the inside annular portion 46 of the diverter valve 13. With the split sleeve 39 expanded securely against the diverter valve 13, the expanding split sleeve tool 36 can be lifted using slight force and the top half 14 of the diverter valve 13 is removed from the bottom section 15 of the valve 13. The top half 14 can be cleaned and replaced or a new top half 14 can be inserted for the old one.

The tool with the tapped end 26 along with the expanding split sleeve tool 35 can be used to separate the top 14 of the diverter valve 13 from the bottom 15 (FIGS. 13 and 14). To separate the top 14 from the bottom 15 the threaded tube 18 of the valve 13 is screwed into the tapped hole tool 26 and the expanding split sleeve tool 35 is tightened onto the top portion 14 of the valve 13. With the valve 13 secure in the tools 26, 35, the tapped end tool 26 is grasped in one hand and the expanding split sleeve tool 35 is grasped in the other and the two tools 26, 35 are flexed or pulled apart to separate the two halves of the valve 14, 15.

Figure 16B:
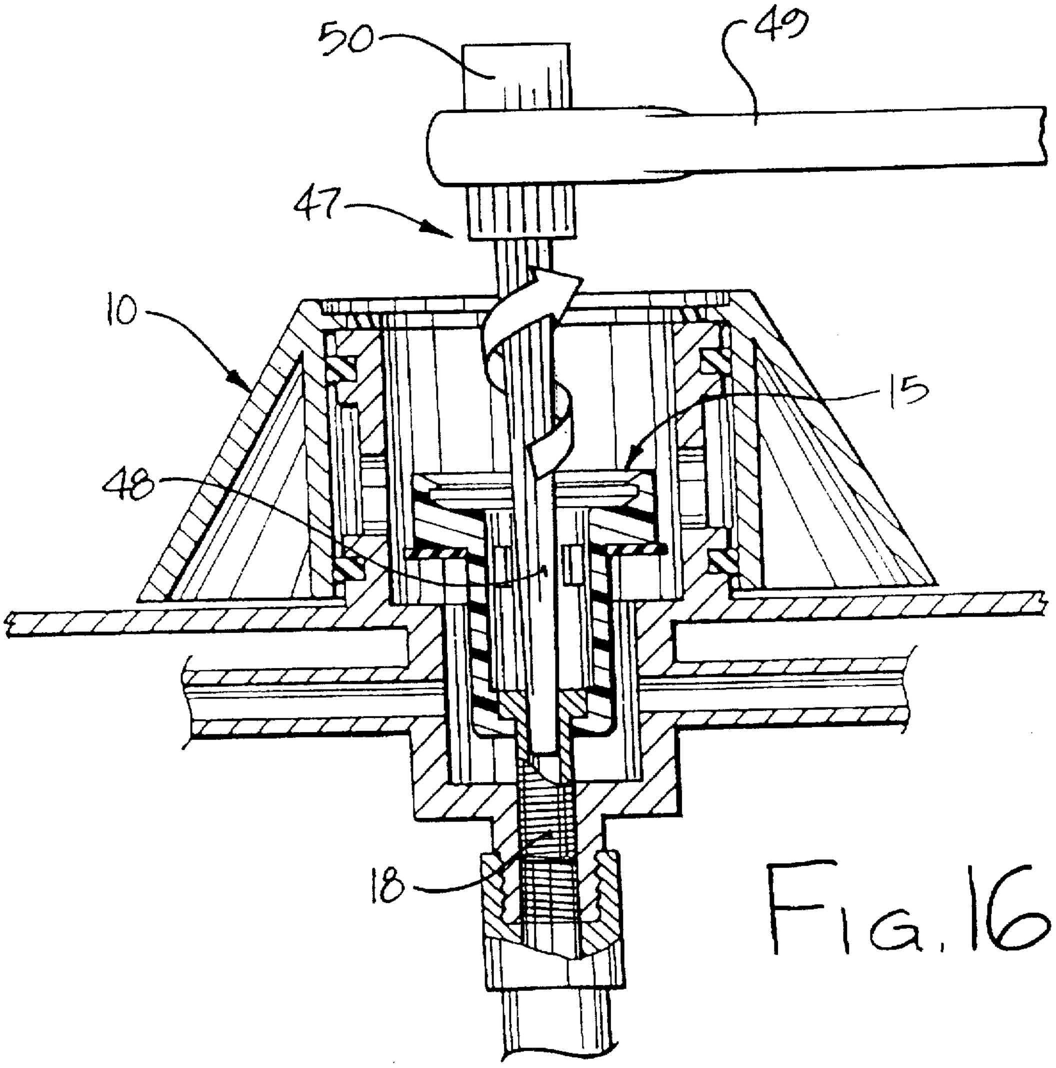
FIG. 16B is a view thereof illustrating a wrench being turned on the elongated wedge tool to extract the threaded tube. The arrow shows the direction in which the wrench is turned.
Figure 16C:
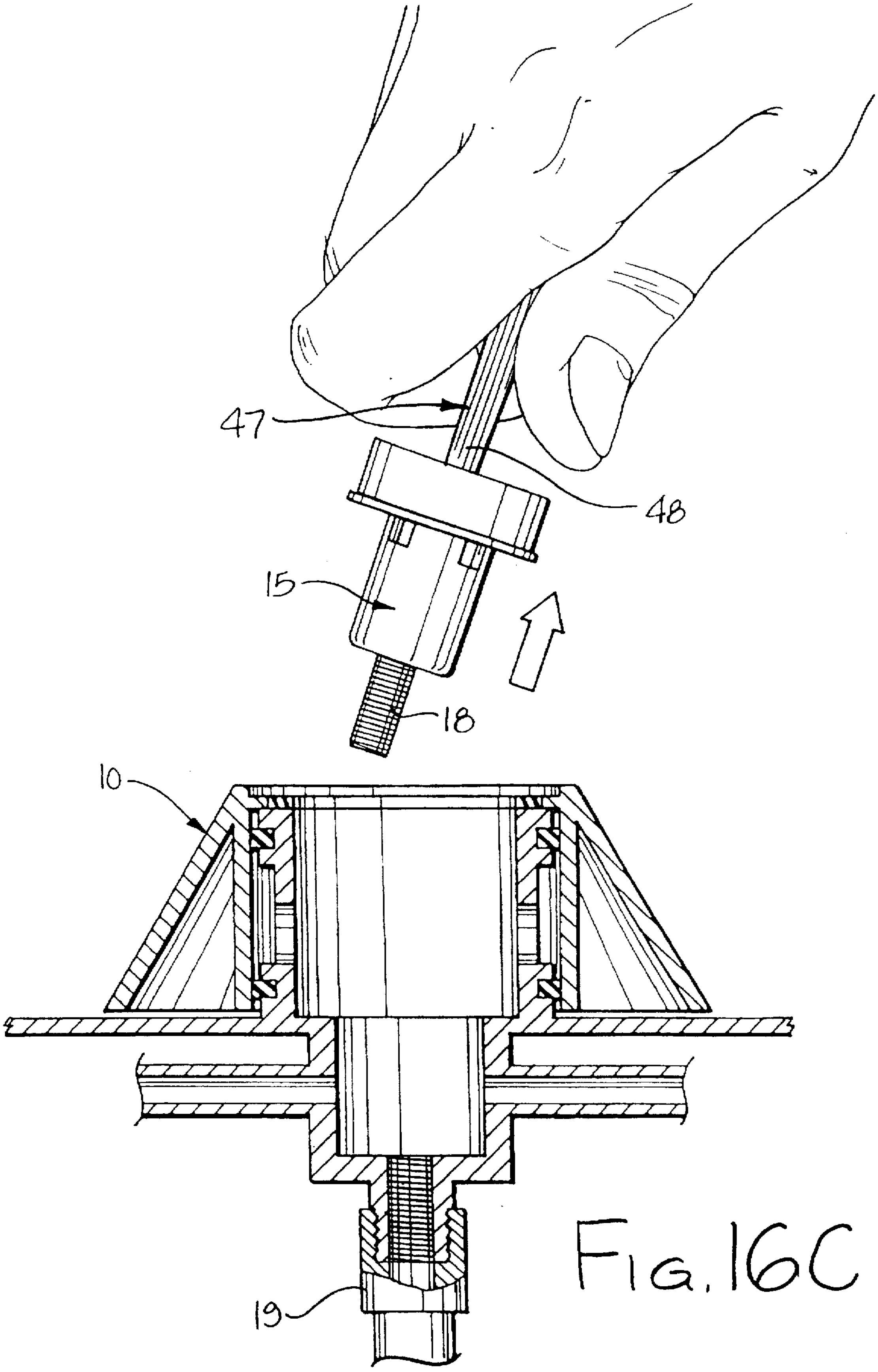
FIG. 16C is a view thereof showing the elongated wedge tool being grasped by hand to lift out the threaded tube attached to the bottom of the valve. The arrow shows the direction in which the bottom of the valve is lifted.

On rare occasion the plastic portion of the diverter valve will separate from the threaded tube 18 or there is a need to remove the bottom half 15 of the diverter valve when the top half 14 has been removed. This invention supplies an elongated wedge tool 47 (FIG. 15) for removing either the bottom half 15 of the valve 13 or the detached threaded tube 18 of the valve 13. To use the elongated wedge 47 tool to remove the threaded tube 18 (FIGS. 16A–16C) simply tap the wedge of the tool 48 securely into the threaded tube 18 (FIG. 16A) and use a wrench 49 on the square end of the tool 50 to unscrew the threaded tube 18 (FIG. 16B) and lift out the bottom section 15 of the diverter valve 13.

Figure 17:
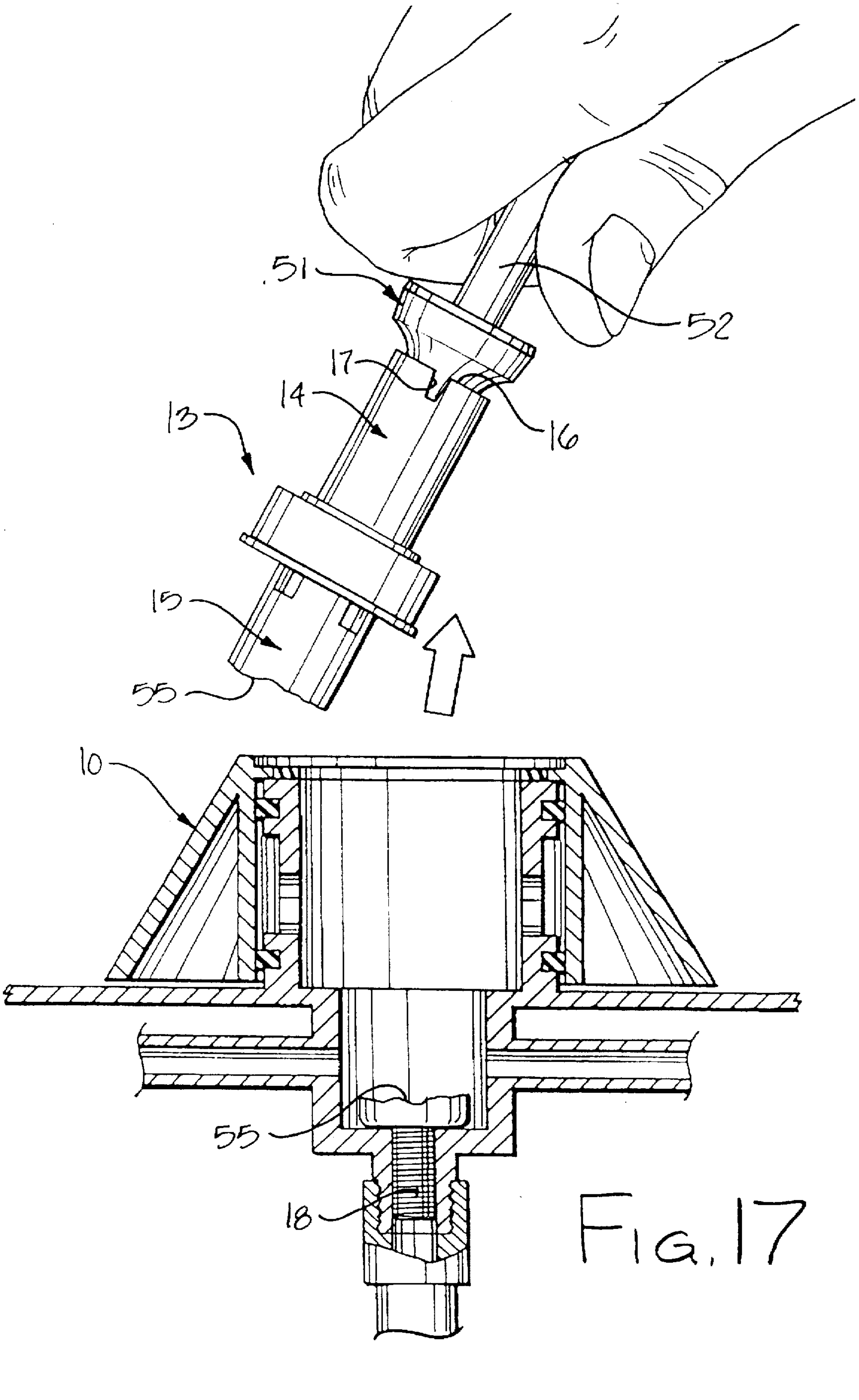
FIG. 17 is a view illustrating the elastomeric wedge tool used to extract a broken and detached plastic valve housing.

Occasionally, there may be a need to simply extract the separated bottom or broken bottom of the plastic portion 15 of the diverter valve 13 from the faucet 10. With this being the case this invention supplies an elastic wedge tool 51 (FIG. 17) with a handle 52 which can simply be inserted with gentle force into the annular top 16 of the diverter valve 13 and by lifting the handle 52 on the elastic wedge tool 51 the plastic portion or broken portion 55 of the diverter valve 13 is extracted from the faucet 10, leaving the threaded tube 18 behind to be extracted using the elongated wedge tool 47.

Figure 18:
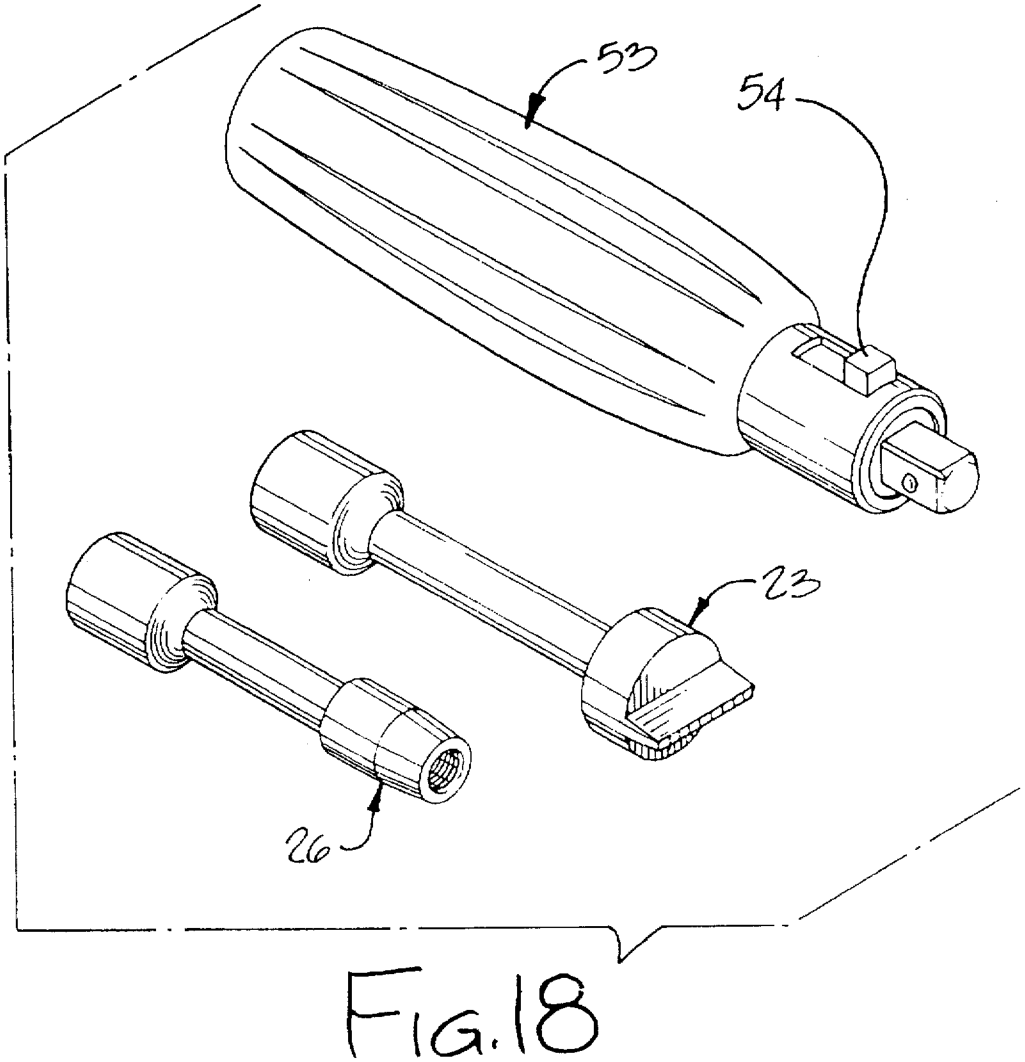
FIG. 18 is a view illustrating tools and an interchangeable handle for receiving the tang end tool or the tapped end tool, with both interchangeable tools also shown.

The tools of this invention 58, for example, the tang and flat shoulder tool 23 and the tapped hole tool 27, are amenable to use with an interchangeable handle 53 and specifically with an interchangeable ratcheting handle 54 (FIG. 18).

Figure 19:
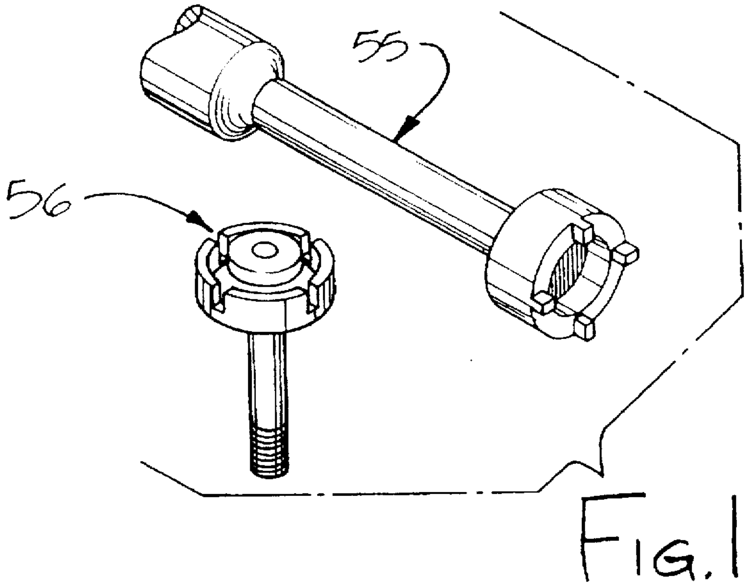
FIGS. 19 and 20 are views depicting tools which can be used to remove other types of diverter valves. The tools have been shortened for ease of illustration.
Figure 20:
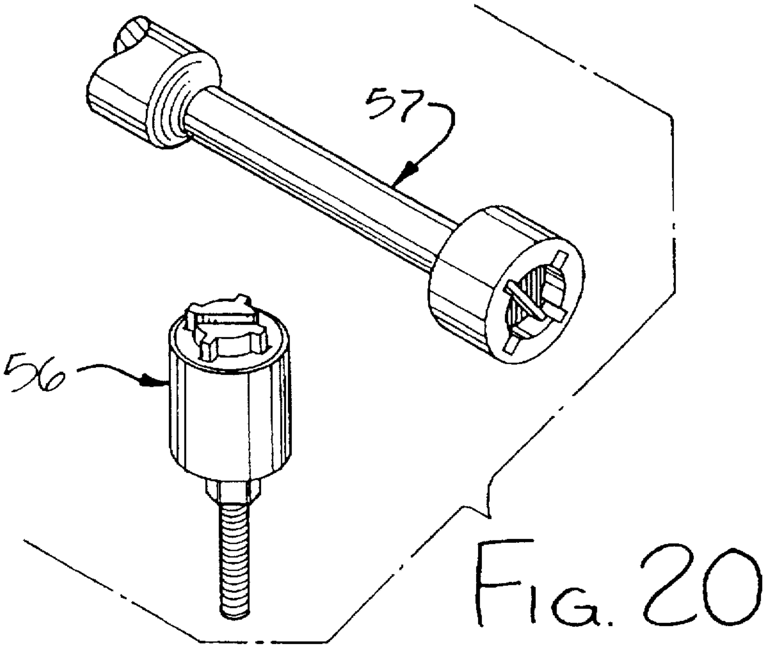

With modifications the tools of this invention will find applicability to other types of diverter valves 56, as exemplified in FIGS. 19 and 20. Alternative diverter valves 56 can be released by alternative tools 57.

Figure 21:
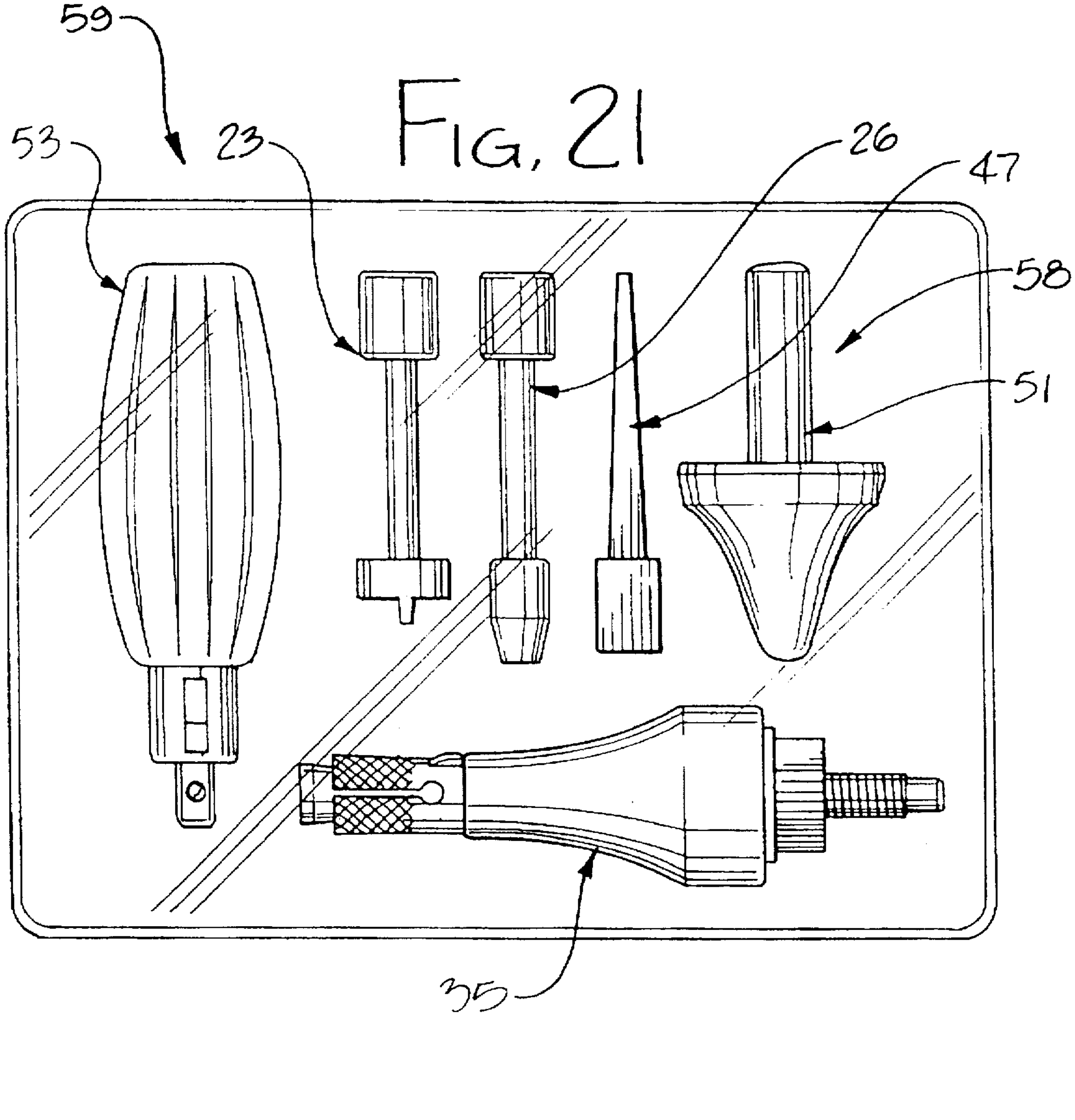
FIG. 21 is a plan view of a kit containing tools to be used for removal and repair of diverter valves.

With reference to FIG. 21 the tools of this invention 58 are contained in a container to form a kit 59 of tools 57. The kit 59 containing tools will be a convenient way of storing or carrying the tools 58 and will also be an advantageous way for displaying tools 58 for sale.

Many advantages are envisioned by the use of the tools of this invention. By being able to repair the diverter valve, the homeowner or building manager will not have to replace the entire faucet, but will only have to replace the diverter valve at substantially saving of time and money. With easy repair of the diverter valve, the manufacturer will save money on warranty repairs. Much time and effort will be saved by repairmen and plumbers using the tools of this invention.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A tool to be used for diverter valve removal, separation and repair, the diverter valve having a top portion, a bottom portion, an annular flat top with two diametrically opposing slots therein and a threaded tube at the bottom of said diverter valve, said tool comprising a tool having a first end portion and a second end portion; the first end portion has at right angles to the longitudinal axis of the tool a flat shoulder with a tang set at right angles to the flat shoulder, said flat shoulder and tang register with said annular flat top with two diametrically opposing slots to supply balanced axial thrust load while unscrewing said diverter valve to thereby prevent damaging and breaking the top of the diverter valve; said second end portion attaches an axial tapped hole for receiving and holding said threaded tube of said diverter valve to facilitate separating the top portion of the diverter valve from the bottom portion of the diverter valve.

2. The tool of claim 1 wherein there is situated between the first end portion and the second end portion a wrench gripping surface.

3. A method for removing a threaded-in diverter valve having a top portion, a bottom portion and an annular flat top accommodating two diametrically opposing slots therein comprising (1) inserting in registry with said annular flat top and said diametrically opposing slots the flat shoulder and tang of a tool, respectively, said tool having a first end portion and a second end portion; the first end portion has at right angles to the longitudinal axis of said tool a flat shoulder with a tang set at right angles to said flat shoulder, said flat shoulder and tang register with said annular flat top accommodating two diametrically opposing slots to supply balanced axial thrust load while unscrewing said diverter valve to thereby prevent damaging and breaking the top of the diverter valve; said second end portion attaches a handle for applying axial thrust load; and (2) applying axial thrust load through said handle to said threaded in diverter valve to remove said diverter valve such that once the diverter valve is removed the top portion can be separated from the bottom portion for service and repair of the diverter valve.

4. An expanding split sleeve tool for easily and efficiently removing the bottom section of a diverter valve or aiding in the separation of the top portion and bottom portion of a diverter valve having a top portion and a bottom portion comprising a shaft having a first end and a second end, said first end being threaded and said second end mounting a frusto-conical wedge with its base at the end of the shaft, an expandable split sleeve having projections and expandable tabs is slidably inserted on said shaft so that the expandable tabs butt against the frusto-conical wedge, a sliding member is inserted over the threaded end of the shaft to butt against projections on the expandable split sleeve at the end opposite the expanding tabs and to also substantially engage threads on the shaft; a flat washer is inserted over the threaded end of the shaft to butt against the sliding member and a nut is threaded onto the shaft to meet the flat washer, in operation said expanding split sleeve tool with its frusto-conical wedge end and expandable tabs inserted into the annular head at the top of a diverter valve and the nut tightened to expand the expandable tabs securely against the wall of the diverter valve, the expanding split sleeve tool is lifted with adequate force, the top portion of the diverter valve will separate from the seated bottom portion of the diverter valve and the top portion of the diverter valve can be separated for service and repair without having to remove the bottom portion of the diverter valve.

5. In a method for extracting the threaded tube of a diverter valve from its seated bottom portion in a faucet after the upper portion has been separated therefrom, the improvement comprising inserting into the exposed portion of said threaded tube the wedge end of an elongated wedge tool having a first end and a second end, the first end has an elongated wedge and the second end has a gripping surface, applying force to the top of the gripping surface to wedge the elongated wedge into the threaded tube and applying a wrench to the gripping surface to easily remove the threaded tube from the water supply and thus being able to remove the lower portion of the diverter valve so that the entire valve can be serviced.

6. In a method for removing the detached annular top portion of a diverter valve having a broken bottom portion due to attempting to remove the diverter valve from a faucet the improvement comprising, (1) fixedly inserting into the annular top portion of said broken diverter valve a tapered wedge of an elastomeric wedge tool, said elastomeric wedge tool having a first end and a second end, the first end having attached thereto a wedge and· the second end having a handle, and (2) lifting said handle to extract the annular top portion attached to the elastomeric wedge tool from the bottom broken portion of the diverter valve.

* * * * *